United States Patent
Klus

(10) Patent No.: US 6,554,893 B2
(45) Date of Patent: *Apr. 29, 2003

(54) FIRE DOOR CORE

(75) Inventor: Donald F. Klus, Tigard, OR (US)

(73) Assignee: Georgia-Pacific Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/985,333

(22) Filed: Nov. 2, 2001

(65) Prior Publication Data

US 2002/0117087 A1 Aug. 29, 2002

Related U.S. Application Data

(63) Continuation-in-part of application No. 09/738,776, filed on Dec. 18, 2000, now Pat. No. 6,340,389.

(51) Int. Cl.$^7$ .................. C04B 14/18; C04B 14/12; C04B 38/08; E04B 5/16

(52) U.S. Cl. ............... 106/675; 106/18.12; 106/602; 106/605; 106/631; 106/772; 106/774; 106/778; 106/DIG. 2; 52/784.11; 264/333

(58) Field of Search ................ 106/602, 605, 106/631, 675, 772, 774, 778, DIG. 2, 18.12; 52/784.11; 264/333

(56) References Cited

U.S. PATENT DOCUMENTS

| | | |
|---|---|---|
| 3,015,626 A | 1/1962 | Kingsbury |
| 3,203,813 A | 8/1965 | Gajardo |
| 3,793,042 A * | 2/1974 | Jacobs et al. ............ 501/118 |
| 3,994,110 A | 11/1976 | Ropella |
| 4,000,241 A | 12/1976 | Dunn |
| 4,015,386 A | 4/1977 | Cook |
| 4,118,325 A | 10/1978 | Becker et al. |
| 4,159,302 A | 6/1979 | Greve et al. |
| 4,297,311 A | 10/1981 | Sherman et al. |
| 4,336,068 A | 6/1982 | Vogel et al. |
| 4,343,127 A | 8/1982 | Greve et al. |
| 4,364,987 A | 12/1982 | Goodwin |
| 4,489,121 A | 12/1984 | Luckanuck |
| 4,746,555 A | 5/1988 | Luckanuck |
| 4,748,771 A | 6/1988 | Lehnert et al. |
| 5,256,222 A | 10/1993 | Shepherd et al. |
| 5,522,195 A | 6/1996 | Bargen |
| 5,558,707 A | 9/1996 | Bernt et al. |
| 5,723,226 A * | 3/1998 | Francis et al. ............ 106/732 |
| 5,945,208 A | 8/1999 | Richards et al. |
| 6,290,769 B1 * | 9/2001 | Carkner ............ 106/675 |
| 6,340,389 B1 * | 1/2002 | Klus ............ 106/18.12 |

FOREIGN PATENT DOCUMENTS

| | | | |
|---|---|---|---|
| AU | 591 637 B | | 12/1989 |
| EP | 031256 | * | 7/1981 |
| EP | 0 106 246 A | | 4/1984 |
| FR | 2803591 | | 7/2001 |
| GB | 1185141 | | 3/1970 |
| GB | 1393899 | | 5/1975 |
| WO | 91/03438 | * | 3/1991 |

OTHER PUBLICATIONS

"Results of Search Report for 'New Fire Door Composition'" Report received from NERAC, Copyright 2001 Nerac, Inc. Mar. 20, 2001 Tech.Spec. Tammy Aston, Citations from CA Search (97–99): CA1 1 through 70.
European Search Report Dated Apr. 16, 2002.
Chemical Abstracts, vol. 116, No. 16, Apr. 20, 1992 Columbus, Ohio, US.
Chemical Abstracts, vol. 115, No. 16, Oct. 21, 1991 Columbus, Ohio, US.
Chemical Abstracts, vol. 82, No. 18, May 5, 1975, Columbus, Ohio, US.

* cited by examiner

Primary Examiner—Anthony J. Green
(74) Attorney, Agent, or Firm—Banner & Witcoff, Ltd.

(57) ABSTRACT

The present invention describes an improved building material composition, useful for example as a fire door core and to improved methods of making this composition. The building material of the present invention consists essentially of expanded perlite, a fireproof binder, clay or vermiculite, and optionally diatomaceous earth, one or more viscosity-enhancing components, reinforcement fibers, and a plasticizer or mixtures thereof. The method of making this improved composition is a semi-continuous batch press method wherein at least the expanded perlite, fireproof binder, and clay or vermiculite are mixed; the mixture compressed in a mold, and the compressed mixture dried.

35 Claims, No Drawings

FIRE DOOR CORE

CROSS-REFERENCE TO RELATED APPLICATIONS

This application is a continuation-in-part of application Ser. No. 09/738,776 filed Dec. 18, 2000, now U.S. Pat. No. 6,340,389.

TECHNICAL FIELD

This invention is in the field of building materials, especially fire-resistant building materials. Specifically, this invention describes a building material having utility as an improved core construction for fire doors and methods of manufacturing the improved fire door core.

BACKGROUND OF THE INVENTION

Fire doors are generally made for the purpose of stopping or delaying the transfer of thermal energy (i.e., heat), from one side of the door to the other side. Current fire-resistant doors generally contain a fire-resistant core usually encased in a door-shaped shell, wherein the shell is made from various materials generally known to those of ordinary skill in the art. The core is customarily bonded or glued to both inside surfaces of the shell.

Fire doors, as used in residential, commercial, and industrial applications, typically are employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the fire wall for a limited time to permit the occupants of a building to escape and to delay the spread of fire until fire control equipment can be brought to the scene.

Various tests have been designed for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards and these standards are incorporated into building codes and architectural specifications. One such standard, ASTM Method E 152, requires a door to maintain its integrity for period ranging up to 1.5 hours while withstanding progressively higher temperatures and erosive effects of a high pressure fire hose at the conclusion of the fire exposure.

Considerations in fire door design, in addition to retarding the advance of fire, include the cost of raw materials and the cost of fabrication. Furthermore, the weight of the door is important, both from the standpoint of ease of handling and cost of transportation. The strength of the door is also a significant factor, since fire doors must pass the above-described water stream tests as well as have the requisite strength to withstand normal use and abuse.

Fire-resistant doors have been made in a variety of constructions utilizing a number of different materials, including wood, metal, and mineral materials. Early forms of fire doors simply comprised wooden cores faced with metal sheeting. Although wood of ample thickness is an effective fire and heat retardant, doors of such construction tend to be heavy and are expensive to fabricate and transport.

Mineral fibers have also been employed in the manufacture of fire doors. The core of a commercial metal fire door principally comprises a composition including mineral fibers and a binder. Such doors suffer, however, from a lack of strength, and handling the friable cores results in the production of irritating dust particles during the manufacturing process.

Current fire-resistant cores are generally constructed using such materials as perlite (which functions as an inorganic filler), gypsum (which functions as the fire resistant material), cement (which functions as a further fire resistant material and counteracts shrinkage of the core), a solution of polyvinyl alcohol and water (which also acts as a binder and increases the viscosity of the mixture of ingredients while also hydrating the gypsum) and fiberglass (which functions as a reinforcing material).

It has also been proposed to make fire doors wherein the core comprises particles of expanded perlite, which are bound together by the use of various hydraulic binders including gypsum, cement, and inorganic adhesive material. In order to provide sufficient strength, particularly to withstand handling of the core during manufacture, the core typically is compressed to compact the mixture to a relatively high density, resulting in a heavy door.

Other fire doors have included conventional gypsum wallboard panels as a core material. However, in order to produce sufficient fire resistance, the thickness required of the wallboard is such as to result in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire door.

Fire door cores that contain a significant proportion of gypsum may lose their fire resistant capabilities in the course of a fire. As is well known, gypsum calcines when contacted with sustained heat. During a fire, calcination of the gypsum in a door core may cause the core to lose strength and integrity, especially when exposed to water, such as a stream of water from a hose. Thus, the fire resistance and structural integrity of such a door core is degraded. Furthermore, current fire-resistant door cores containing gypsum exhibit high water absorption rates thereby increasing both their size and density. Additionally, current fire-resistant door cores have a density significantly greater than the density of the door core of the present invention thereby increasing the cost of manufacturing and transportation. Still furthermore, current fire-resistant door cores exhibit manufacturing difficulties, such as poor cutting qualities, and inability to be sanded after drying to varying thickness that the door cores of the present invention are able to avoid.

Thus, there exists a commercial need for building materials suitable for use as a door core that not only is fire-resistant, but also closer to being fire-proof. In order to meet this commercial need, the door core must maintain its strength and integrity after being exposed to heat. Furthermore, in order to meet the commercial requirements for fire door cores, a door core should be lighter than present fire door cores. Additionally, in order to be commercially viable the new door core must be easily manufactured using techniques well-known in the art, and have improved hose stream resistance. The present invention fulfills all these commercial needs by eliminating gypsum as a major structural component and using an alkali metal silicate as a fireproof binder for a door core having expanded perlite as the major structural component.

SUMMARY OF THE INVENTION

The present invention is directed to a building material composition useful as a fire door core that not only is fire-resistant, but also is closer to being fire-proof. The building material composition (e.g., fire door core) of the present invention meets or exceeds the fire-resistant capabilities of current fire door cores. The building material composition (e.g., fire door core) of the present invention does not contain gypsum in a proportion sufficient to degrade the performance of the composition, e.g., for use as a fire door core, when exposed to an extended period of heat, as in a fire. In fact, the building material composition of this invention is preferably free from gypsum altogether. Without gypsum, the building material composition, e.g., fire door core of the present invention does not calcine, thereby losing strength and integrity, when subject to sustained periods of heat, such as from a fire. The building material composition (e.g., fire door core) of the present invention also uses a fireproof binder that substantially eliminates shrinkage of the composition (e.g., shrinkage of the door core) when the composition, e.g., the door core is subjected to heat. The building material composition, e.g., fire door core of the present invention also contains clay (preferably a fire clay), or vermiculite to reduce shrinkage of the composition, e.g., shrinkage of the door core, when exposed to sustained periods of intense heat. The building material composition (e.g., fire door core) of the present invention can contain additional components that increase the viscosity of the composition, or plasticize the formulation in production steps prior to drying. Additionally, the building material composition (e.g., fire door core) of the present invention can contain other additives such as diatomaceous earth to improve its fire resistant property, or fibers, such as polyolefin fibers, or glass fibers to provide additional reinforcement and strength.

DETAILED DESCRIPTION OF THE INVENTION

The building material composition, preferably in the form of a fire door core, of the present invention consists essentially of a mixture of (1) expanded perlite, (2) a fireproof binder, (3) clay, particularly a fire clay, or vermiculite and optionally (4) diatomaceous earth. The building material composition, especially the fire door core, of the present invention can also optionally contain still additional components, such as a plasticizer to assist formation of the composition from an aqueous mixture of the ingredients, or a fibrous material reinforcement, such as polyolefin fibers, or glass fibers for added strength. These optional additional ingredients do not prevent the composition from fulfilling its use in fire resistant applications. The building material composition when used as a fire door core in accordance with the present invention provides several advantages over current fire-resistant door cores, including but not limited to, increased production capabilities using methods known to those of ordinary skill, decreased raw material consumption, stronger adhesion to door shells, increased tensile and flexural strength, superior hose stream resistance, decreased weight, and better shaping and handling characteristics.

The building material composition, e.g., fire door core, of the present invention does not require gypsum as a main structural component and thereby avoids problems associated with current compositions used as door cores which rely on gypsum. In fact, the building material composition of this invention is preferably free from gypsum altogether. Current door cores that contain gypsum can not be considered fire-proof; at best, they can only be considered fire-resistant. Fire door cores, that contain gypsum as a structural component, have the problem that, when subjected to extended heating, the gypsum calcines and the door core loses its strength and integrity. Thus, when the door core then is contacted by water, typically in the form of a high pressure stream of water from a hose, the integrity of the door is compromised because the calcined gypsum is washed away. The fire door core of the present invention meets or exceeds the capabilities of current fire-resistant cores made with set gypsum in standard fire tests for residential and non-residential use. The fire door core of the present invention also exceeds the capabilities of fire-resistant door cores containing set gypsum in maintaining strength and integrity following prolonged heat, even when exposed to water.

The building material composition, e.g., fire door core, of the present invention is preferably made from (1) expanded perlite, (2) clay, especially a fire clay, or vermiculite, (3) a fireproof binder, (4) diatomaceous earth, (5) optionally a fibrous material and (6) one or more optional additional components to make processing easier. The building material composition, e.g., fire door core, of the present invention is manufactured by combining wet and dry components to form a wet mixture, e.g., a wet door core mixture. The wet mixture, e.g., the wet door core mixture, then is molded and pressed to form a wet composite, e.g., a wet door core. The wet composite, e.g., wet door core, then is dried to form the building material composition, e.g., the fire door core, of the invention.

The building material composition, e.g., fire door core, of the present invention does not have a significant amount of gypsum and preferably has absolutely no gypsum. A significant amount of gypsum is that quantity of gypsum that would be used as a structural component and would decrease the strength and integrity of the building material composition, e.g., fire door core, after the composition, e.g., fire door core, is exposed to prolonged heat. Typically, the proportion of gypsum in a wet composite, e.g., wet door core, of the present invention is less than about 10% of the weight of the wet composite, e.g., wet door core, i.e., after the composite, e.g., fire door core, is pressed but before it is dried. Thus, the proportion of gypsum in a building material composition, e.g., fire door core, of the present invention is less than about 8 wt %, based on the weight of the composition, e.g., the fire door core. At this level of use, the gypsum would primarily serve as filler material. Preferably, the amount of gypsum in the wet composite, e.g., wet door core, is less than about 3% of the weight of the wet composite, e.g., the wet door core (2% of the building material composition, e.g., the fire door core); more preferably, the amount of gypsum is less than about 1% of the weight of the wet composite, e.g., the wet door core (0.8% of the building material composition, e.g., the fire door core); even more preferably, the amount of gypsum is less than about 0.1% of the weight of the wet composite, e.g., the wet door core (0.08% of the building material composition, e.g., the fire door core); and most preferably, the wet composite and building material composition, e.g., the wet door core and the fire door core, are devoid of gypsum. The phrase "consisting essentially of" when used in connection with the present invention and in the claims is intended to exclude not only the use of ingredients that would destroy the fire resistant property of the composition, but also to exclude the use of gypsum in amounts in excess of the limits describe above.

The fireproof binder used in the building material composition, e.g., the fire door core, of the present invention functions to bond together the other components of the composition, e.g., of the door core. The fireproof binder is an alkali metal silicate. Preferably, the alkali metal silicate is sodium silicate or potassium silicate, more preferably it is sodium silicate. Sodium silicate used in the building material composition, e.g., in the fire door core, of the invention typically has a molar ratio of silica to sodium oxide of from about 2.5:1 to about 4:1. Preferably, the ratio of silica to sodium oxide is about 3.22:1.

To serve as a fireproof binder for the expanded perlite and clay, especially for a fire clay, or for the expanded perlite and vermiculite, and the optional diatomaceous earth, the sodium silicate is provided to the mixture generally as an aqueous solution. The solids concentration in this aqueous silicate solution (along with any additional water used to make the wet mixture of ingredients for forming the composition) must yield a wet composite, e.g., a wet door core, that is easy to handle, both during molding operations and after the wet composite, e.g., the wet door core, is removed from the mold, and is economically dried. Silicate solutions having lower or higher solids concentrations can be used. However, too low a solids concentrations may yield a wet mixture, e.g., a wet door core mixture, that is difficult to handle because it is relatively dilute. Too low a solids concentration also may yield a wet mixture, e.g., a wet door core mixture, that lacks dimensional stability (i.e., does not retain its shape after molding) and requires additional heat input during drying operations. On the other hand, too high a solids concentration makes it more difficult to achieve thorough mixing of components in the wet mixture, e.g., in the wet door core mixture, and may yield a wet composite, e.g., a wet door core, that is difficult to handle because it has a high solids content. Typically, the solids content of sodium silicate solution used in this invention is between about 30 and about 50 weight percent, preferably between about 34 and 44 weight percent, more preferably about 37 weight percent solids. A commercial example of the most preferred form of the solution of sodium silicate and water is 'N' grade sodium silicate solution marketed by PQ Corporation of Valley Forge, Pa. This solution has a molar ratio of silica to sodium oxide of 3.22:1 and a solids concentration of 37 weight percent.

The building material composition, e.g., fire door core, of the present invention contains sufficient alkali metal silicate to perform the function of binding the components of the composition, e.g., the fire door core. Typically, the amount of sodium silicate (on a solids basis, such as from a solution of a 37 weight percent solids concentration) used is from about 4 to about 19 percent of the weight of the composition, e.g., the weight of the fire door core. Generally, a greater proportion of sodium silicate is required as perlite density increases. Preferably, the amount of sodium silicate (solids) is from about 5 to about 15 percent, more preferably, from about 6 to about 12 percent, and most preferably, from about 7 to about 11 percent of the weight of the composition, e.g., of the fire door core, especially when the preferred perlite material is used (as described below).

The expanded perlite component of the present invention functions as a light weight aggregate filler for the building material composition, e.g., the fire door core. Expanded perlite is available in various forms as well known to those of ordinary skill in the art. Expanded perlite, suitable for use in the present invention, has a density from about 5 to about 11 lbs per cubic foot. Preferably, perlite expanded to a density of from about 6 to about 10 lbs per cubic foot is used. Most preferably, perlite expanded to a density from about 7 to about 8 lbs per cubic foot is used.

Generally, expanded perlite will be a major structural component of the building material, such as a fire door core. The amount of expanded perlite, preferably perlite having a density of between about 7 and about 8 pounds per cubic foot, typically is from about 50 to about 80 percent, preferably, from about 55 to about 75 percent, and most preferably, from about 60 to about 73 percent of the weight of the building material composition, e.g., the weight of the fire door core. While a combination of perlite density and amount of expanded perlite different from the ranges described herein can be used, skilled practitioners recognize that such a combination has inherent problems. If a more dense perlite is used, manufacturing concerns such as increased production time and cost due to increased water use (the more dense the perlite, the more sodium silicate is required) arise. Use of less dense perlite also raises manufacturing concerns, such as undesirable crushing of the expanded perlite, and economical concerns, such as rising per unit cost of manufacture.

The clay, especially fire clay, or the vermiculite component of the present invention also is well known to skilled practitioners. Any of the various forms of clay, especially fire clay, or vermiculite can be used in making the building composition, such as a fire door core. The amount of clay, especially fire clay, or vermiculite used in the construction of the composition, e.g., the door core, of the present invention is that amount sufficient to prevent shrinkage of the building material composition, e.g., the fire-proof door core, when it is exposed to intense heat. Skilled practitioners recognize that expanded perlite shrinks, in fact it almost fuses, when it is exposed to intense heat (i.e., the heat from prolonged contact with fire), and that the prior degree of perlite expansion tends to increase the extent of such shrinkage. Therefore, the proportion of clay, especially a fire clay, or vermiculite used will vary depending upon both the amount and density of the perlite used in the composition, e.g., in the fire door core. Typically, the amount of clay, especially a fire clay, or the amount of vermiculite used is from about 2 to about 18 percent, often from about 2 to about 11 percent, preferably from about 3 to about 16 percent, such as about 3 to about 8 percent, and in many cases from about 5 to 14 percent, such as from about 5 to about 7 percent, of the weight of the building material composition, e.g., fire door core, especially when the most preferred form of expanded perlite is used.

Any combination of clay, especially fire clay and vermiculite can be used as an anti-shrinking agent. Preferably, for a building material composition, e.g., for a fire door core, of the present invention, the anti-shrinking agent is clay, especially a fire clay. Clay is a hydrated aluminum silicate, often containing other metal oxide impurities. The preferred clay is fire clay. Fire clay is a refractory material and can be obtained from a variety of sources, such as the North American Refractories Co., under the tradename Greenstripe clay. While skilled practitioners will recognize that greater or lesser amounts of clay, especially fire clay, or greater or lesser amounts of vermiculite can be used, they also will realize that using too much clay, especially too much fire clay, and/or too much vermiculite increases manufacturing costs and composition, e.g., door core, densities and that using too little clay, especially too little fire clay, and/or too little vermiculite reduces the strength and integrity of the building material composition, e.g., of the fire door core.

Optionally, one or more additional viscosity-enhancing components, or plasticizers can be used in the producing the building material composition, e.g., the fire door core, of the present invention. The use of additional viscosity-enhancing components in the present invention increases the viscosity of both the wet mixture, e.g., the wet door core mixture, and the wet composite, e.g., the wet door core. The more viscous wet mixture, e.g., wet door core mixture, or wet composite, e.g., wet door core, achieved with these additional viscosity-enhancing components substantially eliminates handling and transport problems that can arise in wet mixtures, e.g., wet door core mixtures, and wet composites, e.g., wet door cores, not using these additional viscosity-enhancing components. Exemplary of some of these additional viscosity-enhancing components are: acetic acid, poly vinyl alcohol, citric acid, polyglycol, propylene glycol, ethylene glycol, sulfuric acid, hydrochloric acid, aluminum sulfate, potassium sulfate, calcium chloride, potassium chloride, lime, magnesium sulfate, sodium citrate, carbon dioxide gas, ammonium sulfate and mixtures thereof. Acetic acid and polyvinyl alcohol are preferred viscosity-enhancing components.

Generally, the amount of the additional viscosity-enhancing components used is sufficient to increase the viscosity of the mixture of the wet mixture, e.g., the wet door core mixture, and the wet composite, e.g., the wet door core. Skilled practitioners recognize that many of the components of the building material composition, e.g., the, fire door core, of the present invention, such as the alkali metal silicate and many of the additional viscosity-enhancing components, are available as solids as well as aqueous solutions of varying concentrations. As described herein, the wet mixture, e.g., the wet door core mixture and wet composite, e.g., wet door core, preferably have a solids concentration, and resultant viscosity, that provides ease of handling, i.e., the solids concentration is not so high as to be difficult to mix or transfer from mixer to mold, and is not so low as to yield a wet composite, e.g., a wet door core, that lacks dimensional stability. Therefore, the form, i.e., whether a solid or an aqueous solution of an individual component, typically is selected so that the solids concentration of the wet mixture, e.g., the wet door core mixture and the wet composite, e.g., the wet door core need not be adjusted. However, additional water may be added to obtain a wet mixture, e.g., a wet door core mixture and then a wet composite, e.g., a wet door core having a desired viscosity, if necessary.

The amount of acetic acid solids used is in this embodiment is generally from about 0.01 to about 2 percent, preferably, from about 0.1 to about 1.8 percent, even more preferably, from about 0.3 to about 1.5 percent, and most preferably from about 0.5 to about 1.3 percent of the weight of the building material composition, e.g., the fire door core. Skilled practitioners recognize that acetic acid often is available in aqueous solutions having a concentration of acetic acid of between about 1 and 99 volume percent of the solution. Any concentration of about less than 10% by volume acetic acid is suitably used, so long as the viscosity of the wet mixture, e.g., the wet door core mixture and the wet composite, e.g., the wet door core, is not adversely affected. Preferably, the concentration of the acetic acid is less than about 5% by volume.

In another embodiment of the invention, the amount of polyvinyl alcohol solids used is generally from 0.01 to about 2 wt. percent, preferably, from about 0.1 to about 1.8 wt. percent, and even more preferably, from about 0.6 to about 1.3 wt. percent of the weight of the building material composition, e.g., the fire door core. Skilled practioners recognize that polyvinyl alcohol often is available in aqueous solutions having a concentration of polyvinyl alcohol of between about 6 and 12 volume percent of the solution. Any concentration of polyvinyl is suitably used, so long as the viscosity of the wet mixture, e.g., the wet door core mixture and the wet composite, e.g., the wet door core, is not adversely affected. Preferably, the concentration of the polyvinyl alcohol solution is about 6 volume percent.

While specific concentrations, amounts, and identity of additional viscosity-enhancing components have been used to describe different embodiments of the present invention, it is apparent to skilled practitioners that these parameters will vary depending on external preferences such as price and availability of the additional components and that the described embodiments do not limit the scope of the claimed invention.

Plasticizers also can be used to facilitate processing of the wet mixture, particularly formulations containing diatomaceous earth. It also is expected that use of a plasticizer will enhance certain physical properties of the building material composition, e.g., certain properties of the fire door core, such as flexibility and toughness. It is preferred to use inexpensive plasticizers such as sugar and sorbitol, though conventional, and generally more costly synthetic organic materials known for their plasticizing effect can also alternatively be used. Such other materials will be readily recognized by those skilled in the art and are commercially available from a number of suppliers.

A plasticizer, when used, would also generally be added to the formulation in an amout of about 0.1 to 4 wt. percent, more usually about 1 to 3 wt. percent, of the weight of the building material composition (that is percent by weight of the solids used in forming the composition). Sugar (sucrose) is a preferred plasticizer given its effectiveness at a low cost.

The building material composition, e.g., the fire door core, of the present invention also can optionally contain fiber reinforcement. Preferably, this fiber reinforcement is either fiberglass (glass fibers), or polyolefin fibers, such as polyethylene fibers and polypropylene fibers. Fiber reinforcement functions as a reinforcement for the expanded perlite, fireproof binder, and clay, especially a fire clay, or vermiculite mixture and the optional diatomaceous earth. The fiber reinforcement improves the material handling properties of the wet mixture, e.g., the wet door core mixture and especially the wet composite, e.g., the wet door core. The amount of fiber reinforcement that can be used to improve the material handling properties of the wet mixture, e.g., the wet door core mixture and especially the wet composite, e.g., the wet door core will depend, among other factors, on the amount and density of the expanded perlite used in making the composition. The amount of fiber reinforcement used in wet mixtures, e.g., in wet door core mixtures and in wet composites, e.g., in wet door cores of the present invention generally increases as the amount of expanded perlite increases. Typically, the amount of fiber reinforcement used is less than about 2 percent, such as from 0.1 to 2 percent, usually less than about 1 percent, such as from 0.1 to 1 percent, preferably, from about 0.5 to about 0.7 percent, each of these percents based on the weight of the building material composition, e.g., the fire door core.

The building material composition, e.g., the fire door core of the present invention may contain other optional components as long as these other components do not adversely affect the advantageous properties, especially the fire resistant property, of the composition, e.g., the fire resistant property of the fire door core, of the present invention. One particularly preferred optional ingredient is diatomaceous earth. Diatomaceous earth is predominately silica and is composed of the skeletal remains of small prehistoric aquatic plants related to algae (diatoms). Particles of diatomaceous earth typically have intricate geometric forms. The irregular particle shapes are believed to improve the overall binding of the composition together and the resultant strength of the composition. Generally, the amount of such other optional components, such as the diatomaceous earth is less than about 30 weight percent of the building material composition, e.g., the fire door core. In the case of the diatomaceous earth in particular, when used the diatomaceous earth will generally be used in an amount of from about 1 to 10 weight percent, more usually from about 2 to about 8 weight percent and most often from about 3 to about 6 weight percent of the building material composition, e.g., the fire door core. The amount of these optional components is preferably less than about 20 weight percent, even more preferably the amount is less than about 10 weight percent.

The building material composition, e.g., the fire door core of the present invention has advantages in manufacture as compared to current methods for manufacturing door cores. The composition of the present invention allows manufacture of the door core to be in semi-continuous batch press mold process. Many known door cores are generally manufactured using a continuous roll press method.

The continuous roll press method is a known process of making fire door cores. Illustrative of the known roll method is the method described in U.S. Pat. No. 5,256,222. A non-solid mixture of the components of the fire door core is deposited onto a moving web drawn from a supply roll by pull rolls. Then, another moving web drawn from its own supply roll by pull rolls is directed by guide and press roll onto the top of the mixture. The thickness of the sandwich of fire door core mixture and webbing then is reduced to a desired value. The roll molded fire door core then is transported by known industrial methods to a drying area. The drying of the roll molded fire door core can be achieved at ambient temperature or by using drying equipment that operates at a temperature greater than room temperature.

In accordance with the semi-continuous batch press mold method of the present invention, the ingredients of the building material composition, e.g., the fire door core, are mixed in a mixing device to produce the wet mixture, e.g., the wet door core mixture. Mixing devices suitably used in this step of the process are well known to skilled practitioners. It is preferred that the ingredients of the composition, e.g., the fire door core ingredients, be mixed in a manner such that the expanded perlite is substantially unbroken. In order to substantially eliminate the breaking of the expanded perlite during mixing, preferably the other components of the composition, e.g., the other fire door core ingredients, are mixed together first. This allows the expanded perlite to thoroughly blend with the other ingredients with a minimum of mixing. The amount of expanded perlite broken during the mixing process can be determined by comparing the volume of the wet mixture, e.g., the wet door core mixture before and after mixing.

The wet mixture, e.g., the wet door core mixture then is transferred to a mold having a shape corresponding to desired composite dimensions. The transfer step can be accomplished using any of the techniques well known to skilled practitioners. The wet mixture, e.g., the wet door core mixture then is compression molded to compact the mixture to the desired density and thickness to produce a wet composite, e.g., a wet door core.

The press molding of the present invention can use any means of pressure well known to those of skilled practitioners and suitable equipment is well known to the skilled worker. Typically, the amount and length of pressure applied is sufficient to bind the ingredients together in a composition, e.g., in a door core, that has a density from about 24 to about 35 pounds per cubic foot, more usually about 24 to about 31 pounds per cubic foot, after drying, while at the same time insufficient to break a significant number of the expanded perlite particles. Generally, the pressure is from about 200 to about 350 pounds per square inch (psi) for a time from about 0.1 to about 2 minutes, preferably, the pressure is from about 225 to about 325 psi for a time from about 0.2 to about 1 minute, more preferably the pressure is from about 250 to about 300 psi from about 0.4 to about 0.7 minute. As skilled practitioners will recognize the exact pressure and time required will vary for different embodiments of the present invention and suitable pressure and time schedules can be determined using routine testing. The wet composite, e.g., the wet door core then is transferred to a drying area.

The wet composite, e.g., wet door core, then is dried to produce the building material composition, e.g., the fire door core of the present invention. The wet composite, e.g., the wet door core is cured (i.e., dried) at a temperature and for a time sufficient to substantially eliminate water from the wet composite, e.g., from the wet door core. Although the drying can be accomplished at ambient temperature, drying at elevated temperatures is preferred. More preferably, drying of the wet composite, e.g., the wet door core, is carried out at a temperature from about 400 to about 700 degrees Fahrenheit for a time from about one to about three and one-half hours, usually for about one to about three hours. Even more preferably, drying is carried out at a temperature from about 400 to about 600 degrees Fahrenheit for a time from about one and one half to about two hours. Most preferably, drying is carried out at a temperature from about 400 to about 500 degrees Fahrenheit for a time of about two hours. Skilled practitioners recognize that specific curing times and temperatures will depend on the exact composition of the wet composite, e.g., the wet door core and suitable temperature and time schedules can be determined using routine testing.

The manufacture of fire door cores of the present invention has several distinct advantages over manufacture of current fire door cores using continuous roll press techniques. The press mold process controls distortion of the door core and allows better thickness control than roll mold processes. Furthermore, there is no need for webbing on the top and bottom surfaces of the door core during manufacturing as is required during continuous roll press operations. Elimination of the webbing required in press roll operations allows the door core of the present invention to be sanded to any desired thickness. Door cores produced using continuous roll press methods and thus having fascias cannot be sanded, and the thickness of the door core coming out of the last roll is, essentially, the final thickness of the door core. Additionally, the press mold method also eliminates the need to strictly control the amounts of water and binder used in the manufacture of fire door cores. In continuous roll press operations, the core will not mold correctly if the viscosity is too low. Greater variations in water content can be accommodated in a mold operation performed in a container of fixed dimensions using various types of equipment. Furthermore, press molding methods of manufacturing fire door cores of the invention require less drying, and so are more energy efficient.

The building material composition, e.g., fire door core of the present invention has other desirable characteristics.

These desirable characteristics differentiate the composition, e.g., the fire door core of the present invention from current fire door cores. The fire door core of the present invention is easier to handle than current fire door cores, and can be manufactured closer to the desired thickness at press than current fire door cores, thus reducing wasteful size adjustments. The fireproof binder used in the composition, e.g., in the fire door cores of the present invention does not deteriorate during either the drying process or in a fire. Therefore, the composition, e.g., the fire door core of the invention can be dried at higher temperatures, thereby increasing production as compared to current fire door cores. The building material composition, e.g., the fire door core of the present invention contains substantially no gypsum, thereby eliminating the dimensional increase of gypsum when exposed to water, calcining in the drying process, hydrating time needed before drying, and increasing the flexural strength, textural strength, hardness and hose stream resistance as compared to current fire door cores. The composition, e.g., the fire door core of the present invention is more easily produced and requires less raw materials than current fire door cores while having a lower density (thereby allowing more fire door cores to be shipped per truck), lower surface dust after sanding, better edges when sawing to size, and stronger adhesion to door skins. Furthermore, future fire door cores of the present invention can be constructed from substantial amounts of dust and waste from previously manufactured fire door cores of the present invention, where current fire door cores can only use the dust and waste from other current fire door cores in very minor amounts.

In this regard, it has been shown that dust collected from sawing and sanding the building material compositions of the present invention can be incorporated at levels of up to about 35 percent by weight (on a solid basis) in making a new composition, such as a door core. It is expected that even higher recirculation amounts could probably be used. However, it should not be necessary to use greater amounts, since a 35 weight percent usage level should provide a manufacturer with enough flexibility to recycle all of the waste generated in a typical door core operation into new cores. When such dust is used, it is used to replace, on a pro-rata basis, the filler ingredients of a wet mixture formulation such as the perlite, the clay and/or the vermiculite and the optional diatomaceous earth. The other core components, especially the fire proof binder, such as an alkali metal silicate, and any fiber reinforcement, and the processing aides such as the water, viscosity-enhancer and plasticizer, should all be used in their normal amounts not reduced by the amount of waste dust recycled.

The following non-limiting examples further illustrate the invention.

EXAMPLE 1

A door core of the present invention of the following composition was manufactured and found to have superior properties when compared to known fire door cores. The fire door core of the present invention had the following composition based on the weight of the wet door core (i.e., the weight of the door core prior to drying) and based upon the weight of fire door core. A 5% by volume acetic acid solution was used.

| Component | Weight Percent of Wet Door Core | Weight Percent of Fire Door Core |
|---|---|---|
| Perlite | 54.7 | 78.0 |
| Fiberglass | 0.5 | 0.7 |
| Water | 14.2 | ≦0.1 |
| Sodium Silicate N | 24.9 | 13.1 |
| Acetic Acid (Solids) | 0.1 | 1.0 |
| Fire Clay | 5.0 | 7.1 |

The fire door core of the present invention was manufactured in the present example as follows:

(1) The perlite, fire clay, and fiberglass were dry-mixed together for approximately 1 minute wherein the sodium silicate N and aqueous solution of acetic acid were added and the components were mixed for approximately one minute, thereby forming the wet door core mixture.

(2) The wet door core mixture was transferred to a fixed dimensional mold.

(3) The wet door core mixture in the fixed dimensional mold was compressed at a pressure of about 250–300 psi for a time of about 0.5 minutes to form the wet door core.

(4) The wet door core was transferred to a drying area and dried at a temperature of about 500–600 degrees Fahrenheit for a time of about 2 hours, to produce one embodiment of the fire door core of the present invention.

A known fire door core had the following composition based on the weight of the wet door core (i.e., the weight of the door core prior to drying) and based upon the weight of fire door core.

| Component | Weight Percent of Wet Door Core | Weight Percent of Fire Door Core |
|---|---|---|
| Perlite | 49.8 | 65.6 |
| Gypsum | 14.9 | 22.2* |
| Portland Cement | 6.6 | 8.8 |
| Polyvinyl Alcohol (solids) | 1.7 | 2.3 |
| Fiberglass | 0.4 | 0.5 |
| Water | 26.6 | ≦0.1 |

*When gypsum sits it absorbs about 12 weight percent water to hydrate the gypsum. The exact amount of water absorbed by the gypsum is dependent on the gypsum's purity.

Properties of the fire door core of the present invention and the known fire-resistant door core are compared below.

| Test | Standard Fire-Resistant Door Core | Fire Door Core of the Present Invention |
|---|---|---|
| Cure Temperature of Manufacture (° F.) | 335 | 500–600 |
| Cure Time (Hours) | 4.5 | 2 |
| Flame Test (° F.) | 1750 | 1750 |
| Flame Test Duration (Min.) | 90 | 90 |
| Unexposed Temperature (° F.) after 0.5 hours | 198 | 221 |
| Unexposed Temperature (° F.) after 1.5 hours | 486 | 502 |

| Test | Standard Fire-Resistant Door Core | Fire Door Core of the Present Invention |
| --- | --- | --- |
| Flame Erosion Test (inches) | 0 | 0 |
| Hose Stream Test (inches) | 0.75–1.0 | 0 |
| Density (lbs./cubic foot) | 33–34 | 25–28 |
| Flexural Strength (lbs./square inch) | 80 | 200 |
| Tensile (lbs./2.25 square inches) | 50 | 150+ |
| Screw Holding (lbs./in) | 133 | 200 |

The density measurement in the above comparison is a range of approximately 15 full-size door cores (1.5"×36"× 84"). The flame test in the above comparison is the temperature that the door core is subjected to on one side to determine the heat-resistance capabilities of the door core. The unexposed temperature is the temperature of the unexposed side of the fire door core after the duration of the flame test.

In the flame erosion test, a propane flame was positioned at a distance of approximately four (4) inches from the surface of the fire door core and adjusted to produce a temperature of approximately 1700° Fahrenheit. The extent of any degradation in the depth of the fire door core was measured, at the point of flame contact, after approximately ninety (90) minutes of exposure to this temperature.

In the hose stream test, a fire door core from the above-described flame erosion test was placed under a stream of water that flows from a hose at a pressure approximately equal to the pressure at which fire-fighting hoses are operated at for approximately two (2) minutes. The erosion of the fire door core's depth from the water stream was then measured.

The flexural strength test measured a specimen of the fire door core that is 1.5 inches thick, 6 inches inch wide and 16 inches long and placed on bearings at 14 inch centers. The force required to break the specimen was then recorded.

The screw holding capacities of the fire door cores were determined as follows: a $5/32$ inch pilot hole was drilled at midwidth of a 1+/–$1/32$ inch thick, at least 9 inch long, and 1$9/16$ inch wide sample of door core that had previously been dried to a constant weight. With the specimen supported on a wooden block or steel plate and the pilot hole centered over a $5/8$ inch hole in the support, a No. 12 sheet metal screw was inserted until the full shank thickness penetrated the specimen. Force was then vertically applied at the center of the screw, forcing the screw through the specimen, and the force recorded.

Tensile strength was measured by adhering 2.25 inch square wooden blocks to both sides of a square piece of fire door core of an ordinary depth having both a length and a width of approximately 2.5 inches. Standard hook eye screws then were inserted into the wooden blocks to a depth such that the standard hook eye screws do not penetrate the square fire door core sample, but have a sufficient holding capability to perform the tensile strength test. The hook eye screws are then attached to a hydraulic cylinder by any known method. The hydraulic cylinder then used sufficient force to pull the square wooden blocks from the sample of the fire door core. The force that pulled the square wooden blocks was then recorded at the point at which the sample of the fire door core was broken.

EXAMPLE 2

A door core of the present invention of the following composition was manufactured and found to have superior or equal desirable properties when compared to known fire door cores. The fire door core of the present invention and the known fire door core had the following compositions based on the weight of each respective fire door core. A 6 weight percent polyvinyl alcohol solution was used to provide the polyvinyl alcohol solids.

| Component | Weight Percent of Standard Fire Door Core | Weight Percent of Fire Door Core of the Present Invention |
| --- | --- | --- |
| Perlite | 70.4 | 73.6 |
| Gypsum | 18.7 | 0 |
| Portland Cement | 8.3 | 0 |
| Fiberglass | 0.5 | 0.6 |
| Sodium Silicate N | 0 | 19.6 |
| Polyvinyl Alcohol (Solids) | 2.1 | 1.2 |
| Water | ≦0.1 | ≦0.1 |
| Fire Clay | 0 | 4.9 |

The fire door core of the present invention was constructed in the manner described in Example 1. At typical commercial prices for the various components, the cost of producing the fire door core of the present invention was lower than that of the known fire door core.

EXAMPLE 3

This example presents a formulation using diatomaceous earth suitable for making a composition having a density of about 32 pcf (pounds per cubic foot), which employs about 32.5% of recycled core dust. Recycled core dust is simply the duct generated and collected from sawing, cutting and otherwise handling earlier manufactured cores. In the formulation, the 30 mass units of core dust replaces, on a pro-rata basis 30 mass units of the perlite, clay and diatomaceous earth from a corresponding formulation made without such dust. The composition can be manufactured by (1) dry mixing the recycled dust, perlite, fire clay, diatomaceous earth and fiberglass into a well-mixed composition, at which point, the sodium silicate N, sugar plasticizer and extra water can be added and the components uniformly mixed, thereby forming a wet mixture; (2) transferring the wet mixture to a fixed dimensional mold; (3) compressing the wet mixture in the fixed dimensional mold at a pressure of about 250–300 psi for a time of about 0.5 minutes to form a wet composite and (4) drying the wet composite at a temperature of about 500–600 degrees Fahrenheit for a time of about 2 hours.

| Component | Unit Weight of Wet Mixture | Weight Percent of Composition |
| --- | --- | --- |
| Perlite | 36.3 | 39.3 |
| Diatomaceous Earth | 4.4 | 4.8 |
| Fiberglass | 0.5 | 0.5 |
| Water | 6.8 | ≦0.1 |
| Sodium Silicate N# | 27.2 | 10.2* |
| Sugar | 1.7 | 1.8 |
| Recycled Core Dust | 30 | 32.5 |
| Fire Clay | 9.4 | 10.2 | supplied as a 37% solids solution
*on a solids only basis

EXAMPLE 4

This example presents a formulation using diatomaceous earth suitable for making a composition having a about 28 pcf. The composition can be manufactured by (1) dry mixing the perlite, fire clay, diatomaceous earth and fiberglass into a well-mixed composition, at which point, the sodium silicate N, sugar plasticizer and extra water can be added and the components uniformly mixed, thereby forming the wet mixture; (2) transferring the wet mixture to a fixed dimensional mold; (3) compressing the wet mixture in the fixed dimensional mold at a pressure of about 250–300 psi for a time of about 0.5 minutes to form a wet composite and (4) drying the wet composite at a temperature of about 500–600 degrees Fahrenheit for a time of about 2 hours.

| Component | Unit Weight of Wet Mixture | Weight Percent of Composition |
| --- | --- | --- |
| Perlite | 50.8 | 61.6 |
| Diatomaceous Earth | 6.2 | 7.5 |
| Fiberglass | 0.5 | 0.6 |
| Water | 6.8 | ≦0.1 |
| Sodium Silicate N# | 27.2 | 12.2* |
| Sugar | 1.7 | 2.1 |
| Fire Clay | 13.2 | 16 | supplied as a 37% solids solution
*on a solids only basis

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A building material composition consisting essentially of:
   (a) expanded perlite,
   (b) a fireproof binder,
   (c) clay or vermiculite,
   wherein said building material composition has a density of from about 24 to about 35 pounds per cubic foot and wherein said expanded perlite is from about 50 to about 80 weight percent of the building material composition.

2. The building material composition of claim 1 wherein the expanded perlite has a density of from about 7 to about 8 pounds per cubic foot.

3. The building material composition of claim 2 wherein said fireproof binder is selected from the group consisting of potassium silicate, sodium silicate, and combinations thereof and is from about 4 to about 19 weight percent of the building material composition.

4. The building material composition of claim 3 wherein said clay or vermiculite is from about 2 to about 18 weight percent of the building material composition.

5. A building material composition consisting essentially of:
   (a) expanded perlite,
   (b) a fireproof binder,
   (c) clay or vermiculite,
   (d) reinforcement fibers, said reinforcement fibers present in an amount of about 0.1 to about 2.0 weight percent of the building material composition, wherein said building material composition has a density of from about 24 to about 35 pounds per cubic foot.

6. The building material composition of claim 5 wherein said reinforcement fibers are selected from the group consisting of glass fibers and polyolefin fibers.

7. A building material composition consisting essentially of:
   (a) expanded perlite,
   (b) a fireproof binder,
   (c) clay or vermiculite and
   (d) diatomaceous earth.

8. The building material composition of claim 7 wherein the expanded perlite has a density of from about 6 to about 10 pounds per cubic foot.

9. The building material composition of claim 7 having a density of from about 26 to about 35 pounds per cubic foot.

10. The building material composition of claim 7 wherein said expanded perlite is from about 50 to about 80 weight percent of the composition.

11. The building material composition of claim 7 wherein said fireproof binder is selected from the group consisting of potassium silicate, sodium silicate, and combinations thereof.

12. The building material composition of claim 7 wherein said fireproof binder is from about 4 to about 19 weight percent of the composition.

13. The building material composition of claim 7 wherein said fireproof binder is from about 5 to about 15 weight percent of the composition.

14. The building material composition of claim 7 wherein said clay or vermiculite is from about 2 to about 18 weight percent of the composition.

15. The building material composition of claim 7 wherein said clay or vermiculite is from about 3 to about 16 weight percent of the composition.

16. The building material composition of claim 14 wherein said clay is a fire clay.

17. The building material composition of claim 15 wherein said clay is a fire clay.

18. A building material composition consisting essentially of:
   (a) expanded perlite,
   (b) a fireproof binder,
   (c) clay or vermiculite
   (d) diatomaceous earth and
   (e) reinforcement fibers.

19. The building material composition of claim 18 wherein said reinforcement fibers are selected from the group consisting of glass fibers and polyolefin fibers.

20. The building material composition of claim 19 wherein said reinforcement fibers are present in an amount of about 0.1 to about 2.0 weight percent of the composition.

21. A fire door core consisting essentially of:
   (a) expanded perlite in an amount from about 50 to about 80 weight percent of said fire door core;
   (b) a fireproof binder in an amount from about 4 to about 19 weight percent of said fire door core;
   (c) clay or vermiculite in an amount from about 2 to about 18 weight percent of said fire door core and
   (d) diatomaceous earth in an amount from about 1 to 10 weight percent of said fire door core.

22. The fire door core of claim 21 wherein wherein the expanded perlite has a density of from about 6 to about 10 pounds per cubic foot.

23. The fire door core of claim 22 wherein said fireproof binder is selected from the group consisting of potassium silicate, sodium silicate, and combinations thereof.

24. The fire door core of claim 23 wherein the clay is a fire clay.

25. The fire door core of claim 24 having a density of from about 26 to about 35 pounds per cubic foot.

26. A fire door core consisting essentially of:
(a) expanded perlite in an amount from about 50 to about 80 weight percent of said fire door core;
(b) a fireproof binder in an amount from about 4 to about 19 weight percent of said fire door core;
(c) clay or vermiculite in an amount from about 2 to about 18 weight percent of said fire door core and
(d) diatomaceous earth in an amount from about 1 to 10 weight percent of said fire door core and
(e) reinforcement fibers present in an amount of about 0.1 to about 2.0 weight percent of the composition.

27. The fire door core of claim 26 wherein wherein the expanded perlite has a density of from about 6 to about 10 pounds per cubic foot.

28. The fire door core of claim 27 wherein said fireproof binder is selected from the group consisting of potassium silicate, sodium silicate, and combinations thereof.

29. The fire door core of claim 28 wherein the clay is a fire clay.

30. The fire door core of claim 29 having a density of from about 24 to about 35 pounds per cubic foot.

31. The fire door core of claim 28 wherein said reinforcement fibers are selected from the group consisting of glass fibers and polyolefin fibers.

32. A method of making a building material composition comprising:
(a) combining expanded perlite, a fireproof binder, diatomaceous earth and clay or vermiculite to form a wet mixture;
(b) press molding the wet mixture formed in step (a) in a press mold at a pressure from about 200 to about 350 pounds per square inch for a time of from about 0.1 to about 2.0 minutes sufficient to bind the mixture together into a wet composite; and
(c) curing the wet composite of step (b) at a temperature of from about 400 to about 700 degrees Fahrenheit for a time of from about 1 to about 3.5 hours sufficient to remove substantially all the water from the composite and to form the building material composition.

33. The method of claim 32 wherein step (b) is performed at a pressure and time so that the density of the building material composite of step (c) is from about 26 to about 35 pounds per square inch.

34. A method of making a building material composition comprising:
(a) combining expanded perlite, a fireproof binder, diatomaceous earth, a plasticizer, reinforcement fibers and clay or vermiculite to form an aqueous wet mixture;
(b) press molding the aqueous wet mixture formed in step (a) in a press mold for a time and at a pressure sufficient to bind the mixture together into a wet composite; and
(c) curing the wet composite of step (b) for a time and temperature sufficient to remove substantially all the water from the composite and to form the building material composition,
wherein said press molding and curing forms a building material composition having a density of from about 24 to about 35 pounds per cubic foot.

35. The method of claim 34 wherein said fireproof binder is an alkali metal silicate, said reinforcement fibers are selected from the group consisting of glass fibers and polyolefin fibers, and said plasticizer is sugar.

* * * * *